(12) United States Patent
Ma et al.

(10) Patent No.: US 11,703,820 B2
(45) Date of Patent: Jul. 18, 2023

(54) MONITORING MANAGEMENT AND CONTROL SYSTEM BASED ON PANORAMIC BIG DATA

(71) Applicant: c/o Xiamen University of Technology, Fujian (CN)

(72) Inventors: Ying Ma, Fujian (CN); Shunzhi Zhu, Fujian (CN); Yu Sun, Fujian (CN); Junwen Lu, Fujian (CN); Keshou Wu, Fujian (CN)

(73) Assignee: Xiamen University of Technology, Fujian (CN)

( * ) Notice: Subject to any disclaimer, the term of this patent is extended or adjusted under 35 U.S.C. 154(b) by 0 days.

(21) Appl. No.: 17/703,074

(22) Filed: Mar. 24, 2022

(65) Prior Publication Data

US 2022/0214657 A1    Jul. 7, 2022

Related U.S. Application Data

(63) Continuation of application No. PCT/CN2020/097865, filed on Jun. 24, 2020.

(30) Foreign Application Priority Data

Jun. 8, 2020 (CN) .......................... 202010514142.5

(51) Int. Cl.
G05B 19/042    (2006.01)

(52) U.S. Cl.
CPC ................... *G05B 19/0428* (2013.01); *G05B 2219/24024* (2013.01)

(58) Field of Classification Search
CPC ........... G06T 3/0068; G06T 7/30; G06T 7/32; G06T 7/33; G06T 7/337; G06T 7/70; G06T 7/73; G06T 7/74; G06T 7/97; G06T 2207/30244; G06V 10/74; G06V 10/761; G06V 10/96
See application file for complete search history.

(56) References Cited

U.S. PATENT DOCUMENTS

| 9,706,119 | B2 | 7/2017 | Steuart, III |
| 10,262,437 | B1* | 4/2019 | Ter Beest, III ......... G06F 16/29 |
| 2016/0005229 | A1 | 1/2016 | Lee et al. |

FOREIGN PATENT DOCUMENTS

| CN | 102782723 A | 11/2012 |
| CN | 103582893 A | 2/2014 |

(Continued)

OTHER PUBLICATIONS

International Search Report and English Translation cited in PCT/CN2020/097865 dated Mar. 8, 2021, 5 pages.

(Continued)

*Primary Examiner* — Andrew W Johns
(74) *Attorney, Agent, or Firm* — Cooper Legal Group LLC

(57) ABSTRACT

The present disclosure discloses a monitoring management and control system based on panoramic big data comprising an imaging device, a credential of the imaging device, a memory, a networking device, and a processing unit. The imaging device is configured to detect a first object and determine an approximate location of the first object and a reliability value of the approximate location of the first object based on the credential of the imaging device, the memory, the networking device, and the processing unit.

5 Claims, 6 Drawing Sheets

(56) References Cited

FOREIGN PATENT DOCUMENTS

| | | | |
|---|---|---|---|
| CN | 104915374 | A | 9/2015 |
| CN | 107889531 | A | 4/2018 |
| CN | 108474661 | A | 8/2018 |
| CN | 109073761 | A | 12/2018 |
| CN | 208424630 | U | 1/2019 |
| CN | 109640032 | A | 4/2019 |
| CN | 110177211 | A | 8/2019 |
| CN | 110689484 | A | 1/2020 |
| WO | 2002065786 | A1 | 8/2002 |
| WO | 2016041953 | A1 | 3/2016 |

OTHER PUBLICATIONS

Written Opinion cited in PCT/CN2020/097865 dated Mar. 8, 2021, 4 pages.

* cited by examiner

The imaging device comprises an optical sensor, an approximate location module, a reliability value module, and a matching module

↓

The optical sensor is configured to detect the first object,
the approximate location module is configured to determine the approximate location of the first object

↓

The reliability value module is configured to determine the reliability value of the approximate location based on the credential of the imaging device or a topology structure

↓

Determine the surface that is associated with the first object or the proximity between the imaging device and the first object

↓

The matching module is configured to determine whether the predefined location of the second object matches the approximate location of the first object within the predefined margin of error,
when there is a mismatch greater than the predefined margin of error, the processor is configured to store the first object and its approximate location on the distributed image elements, and
when there is a match within the predefined margin of error, the processor is configured to determine the exact location of the imaging device based on the predefined location stored in the memory.

FIG. 3

MONITORING MANAGEMENT AND CONTROL SYSTEM BASED ON PANORAMIC BIG DATA

RELATED APPLICATIONS

This application is a continuation of International patent application number PCT/CN2020/097865, filed on Jun. 24, 2020, which claims priority to Chinese patent application number 202010514142.5, filed on Jun. 8, 2020. International patent application number PCT/CN2020/097865 and Chinese patent application number 202010514142.5 are incorporated herein by reference.

FIELD OF THE DISCLOSURE

The present disclosure relates to a field of monitoring management and control and in particular to a monitoring management and control system based on panoramic big data.

BACKGROUND OF THE DISCLOSURE

The existing monitoring systems generally transmit data to a monitoring center for display to realize real-time video monitoring, but an area that each camera can observe is limited, and the existing monitoring systems cannot realize all-round and large-scale monitoring.

Chinese patent CN109640032A discloses a five-dimensional early-warning system based on artificial intelligence multi-factor panoramic monitoring detection. Different distances of monitored objects, different illumination, different installation height angles, etc., have greatly restricted promotion of this system and use of this new technology. Secondly, the existing panoramic stitching technology still has some shortcomings. Lenses of video cameras are all fixed-focus lenses when the video cameras leave the factory. Even if the lenses of video cameras are zoom lenses, people need to disassemble the video cameras to manually adjust parameters of the lenses, restore the video cameras, and then modify the parameters through software to achieve the best splicing effect. Furthermore, due to a height of and an angle of the video cameras, the video cameras are not easy to take down and install. Such a cumbersome operation process is difficult for non-professionals to grasp and deal with. Another typical prior art, such as WO2002065786A1, discloses a method and device for OMNI directional imaging and three-dimensional data collection and a data induction and dynamic range expansion method. However, it is impossible to monitor the panorama in real time, and seamless splicing cannot be achieved through a splicing processing. U.S. Pat. No. 9,706,119B2 discloses a digital camera system, but such simple stereo photography cannot achieve an enlarged or panoramic field of view. In addition, a comfortable visual angle cannot be obtained, and the degree of overlap of visual field images exceeds the range of human eye recognition.

In order to solve the problems of complicated parameter adjustment, poor panoramic view monitoring, poor visual angle, and the overlapping degree of visual field images exceeding the range of human eye recognition, the present disclosure has been made in this field.

BRIEF SUMMARY OF THE DISCLOSURE

The present disclosure provides a monitoring management and control system based on panoramic big data to solve the deficiencies in the background.

In order to solve the technical problem, a first technical solution of the present disclosure is as follows.

A monitoring management and control system based on panoramic big data comprises an imaging device, a credential of the imaging device, a memory, a networking device, and a processing unit. The imaging device is configured to detect a first object and determine an approximate location of the first object and a reliability value of the approximate location of the first object based on the credential of the imaging device, the memory, the networking device, and the processing unit.

In a preferred embodiment, the credential of the imaging device is configured to be a topology of a surface that is associated with the first object or proximity between the imaging device and the first object, and the memory is configured to store a predefined location of a second object. The imaging device is configured to determine whether the predefined location of the second object matches the approximate location of the first object within a predefined margin of error. When there is a mismatch greater than the predefined margin of error, the first object and distributed image elements of the approximate location of the first object are stored. When there is a match within the predefined margin of error, the imaging device determines an exact location of the imaging device and sets an estimated position according to image elements stored in the memory.

In a preferred embodiment, the imaging device comprises an optical sensor, an approximate location module, a reliability value module, and a matching module. The optical sensor is configured to detect the first object, and the approximate location module is configured to determine the approximate location of the first object. The reliability value module is configured to determine the reliability value of the approximate location based on the credential of the imaging device or a topology structure, and a surface that is associated with the first object or the proximity between the imaging device and the first object is determined. The matching module is configured to determine whether a predefined location of a second object matches the approximate location of the first object within a predefined margin of error. When there is a mismatch greater than the predefined margin of error, the processing unit is configured to store the first object and the approximate location of the first object on the distributed image elements. When there is a match within the predefined margin of error, the processing unit is configured to determine an exact location of the imaging device based on the predefined location stored in the memory.

In a preferred embodiment, the networking device is configured to access a network server to determine a position of the imaging device based on the network server using a navigation system, a positioning system, an accelerometer, a gyroscope, a magnetometer, a compass, and a barometer. An approximate location of a target object is collected by using the imaging device, and the approximate location of the first object is determined by estimating a distance between the first object and surrounding objects. A second object and a predefined location of the second object are searched in a known database, and the second object and the predefined location of the second object are stored in the memory.

In a preferred embodiment, the processing unit is configured to recognize a second object in a known database by matching a feature of the first object with known objects. The feature comprises a topology of an associated surface, an identifiable feature, or at least one position in the feature, and the identifiable feature comprises text, mark, or edge information.

In a preferred embodiment, the imaging device is configured to recognize the first object as a stationary object based on when the first object has a rigid structure property and a geographic location that can be referenced to a specific position within a specific duration, and the first object is collected according to the reliability value of the approximate location or the specific duration. The first object is ranked based on an identifiable feature. When the first object is ranked above a predefined rank, the first object and the approximate location of the first object are stored on distributed image elements.

The present disclosure has the following advantages.

1. Classification is simpler and more reliable by generating the credential of the imaging device including dividing the image elements collected by the imaging device and generating a unique identifier of a corresponding collection device (i.e., the imaging device) by labeling feature data according to the image elements which have been divided.

2. Security of data transmission can be ensured by the environment generator performing verification based on the credential of the imaging device.

3. After data is collected by the imaging device, the processing unit is configured to reconstruct an environment based on the data collected by the imaging device, gradually construct a panoramic view of the environment, make a judgment about an estimated position of a surrounding environment, and make a final determination of the estimated position combined with a collection of big data of the networking device.

3. The reliability value module is configured to determine the reliability value of the approximate location based on at least one of the credential of the imaging device, the topology of the surface that is associated with the first object, or the proximity between the imaging device and the first object to ensure that the collected images conform to the construction of the entire panorama.

4. By using the matching module to switch the same location and switch between different locations, the whole system has an advantage of high response.

5. By using the network server and the network server to collect big data, the construction of a panoramic environment monitoring is made more reasonable and reliable.

BRIEF DESCRIPTION OF THE DRAWINGS

FIG. 3 illustrates a controlling flow chart of an imaging device.

DETAILED DESCRIPTION OF THE EMBODIMENTS

Figure 1:
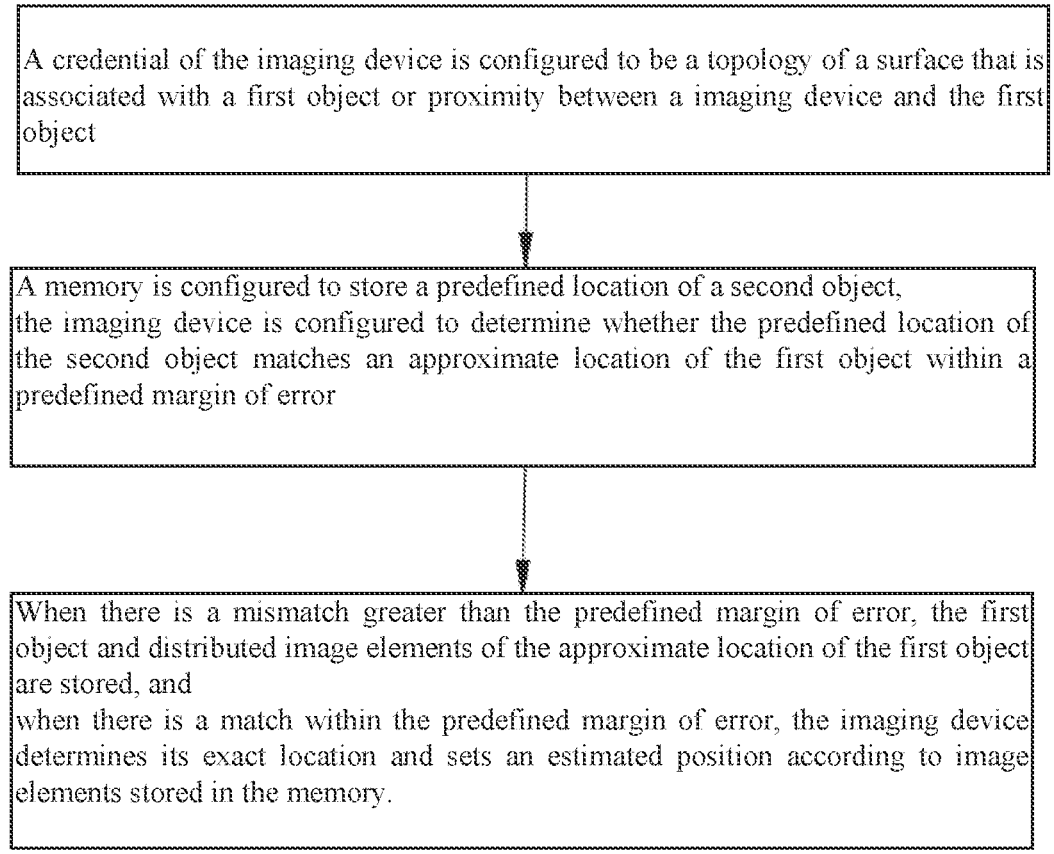
FIG. 1 illustrates a controlling flow chart of a credential of the imaging device.
Figure 2:
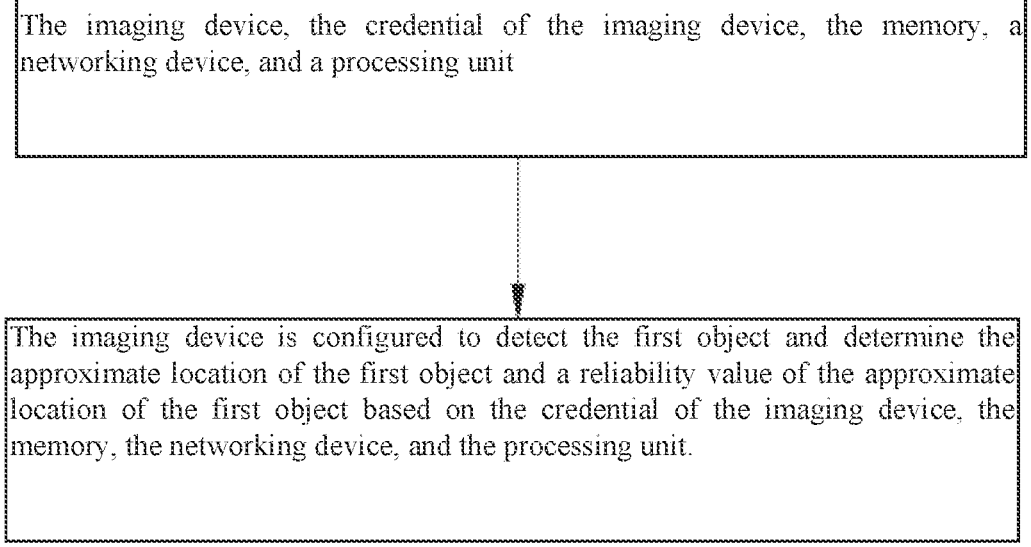
FIG. 2 illustrates a controlling flow chart of a monitoring management and control system.
Figure 4:
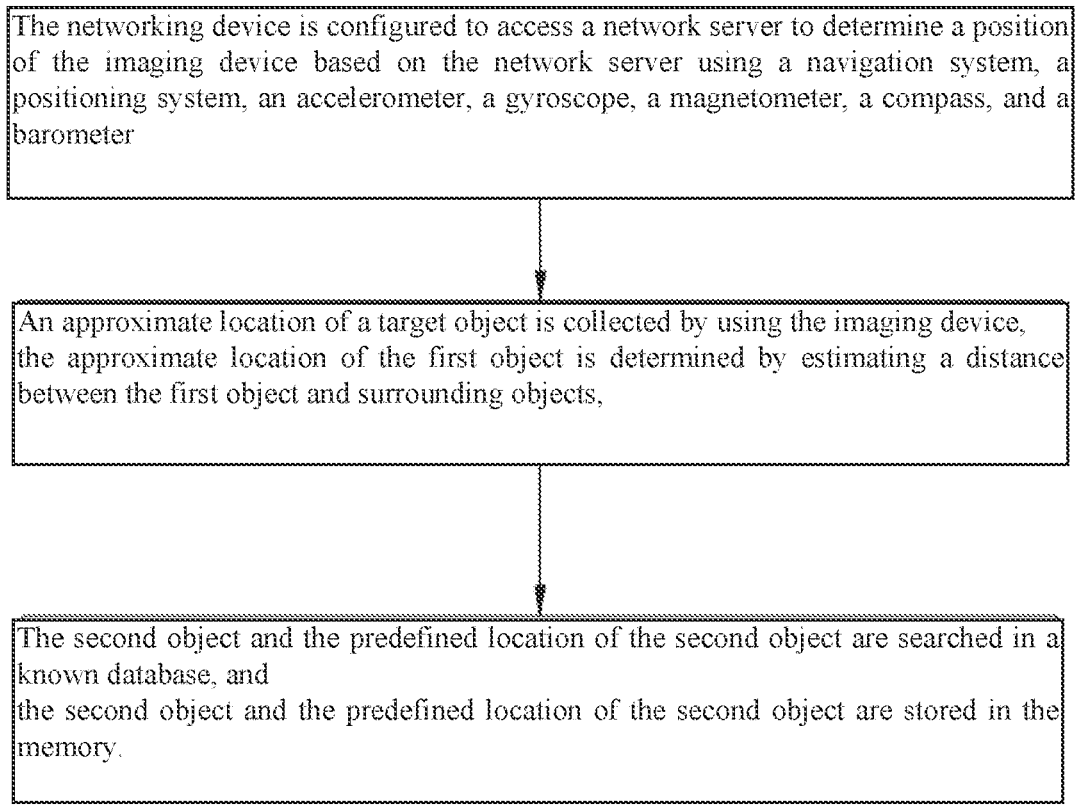
FIG. 4 illustrates a controlling flow chart of a networking device.
Figure 5:
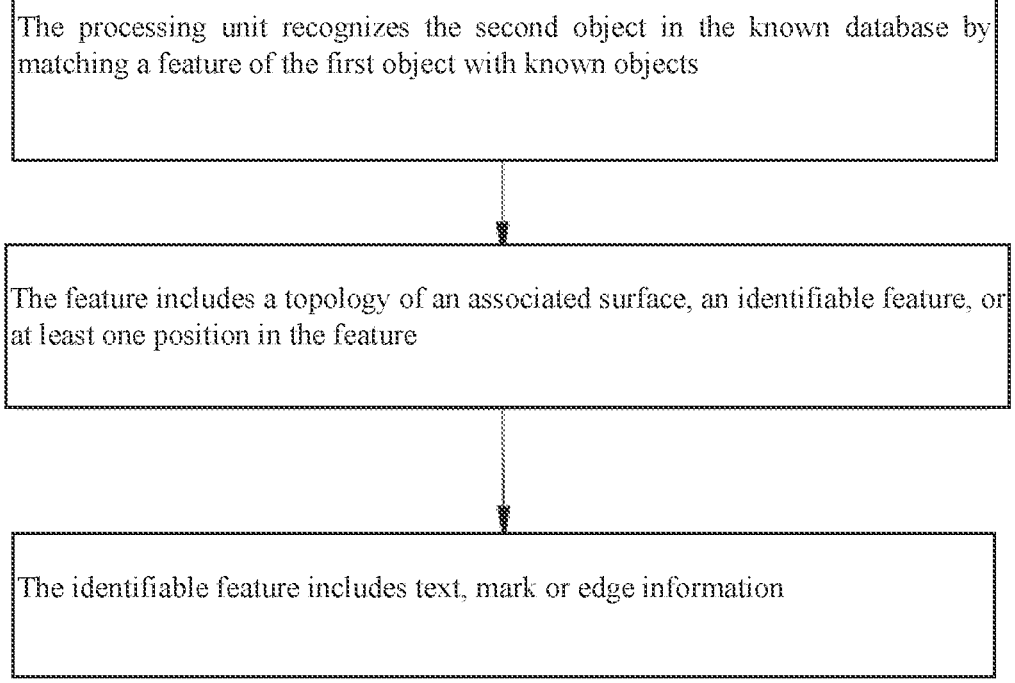
FIG. 5 illustrates a controlling flow chart of a processing unit.
Figure 6:
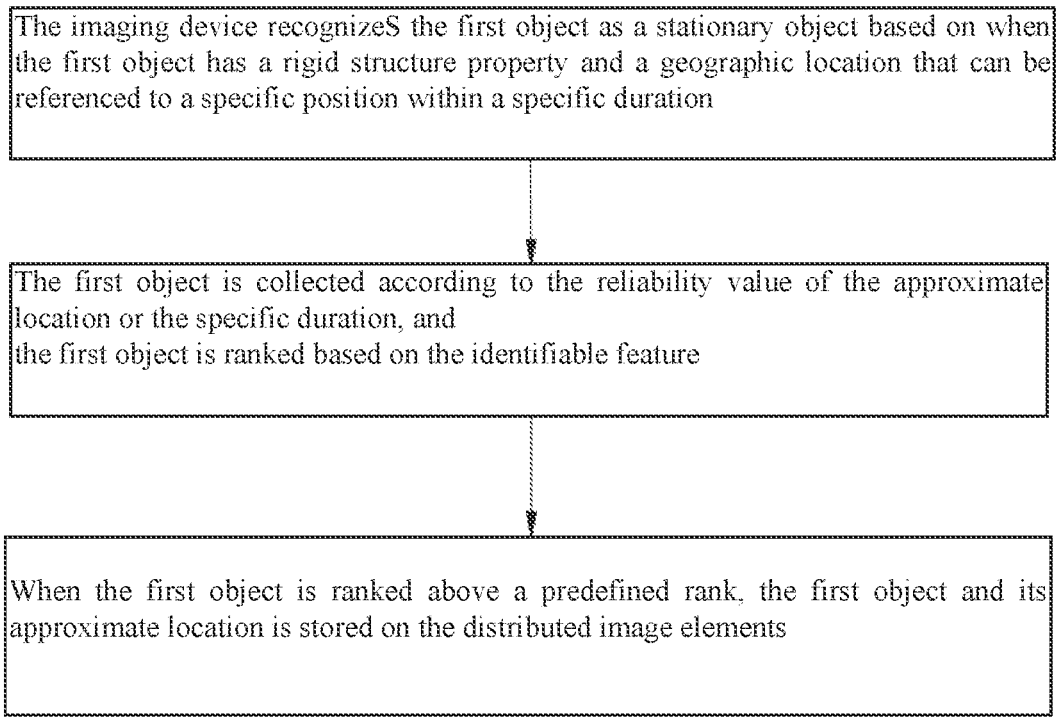
FIG. 6 illustrates a controlling flow chart when the imaging device performs recognition.

In order to make the objects and advantages of the present disclosure more apparent, the present disclosure will be further described in detail with reference to the following embodiments. It should be understood that the specific embodiments described herein are merely illustrative of the disclosure and are not intended to limit the disclosure. Other systems, methods, and/or features of the present embodiments will become apparent to those skilled in the art upon review of the following detailed description. It is intended that all such additional systems, methods, features, and advantages be included within this description, be within the scope of the disclosure, and be protected by the accompanying claims. Additional features of the disclosed embodiments are described in, and will be apparent from, the detailed description that follows.

The same or similar reference numerals in the drawings of the embodiments of the present disclosure correspond to the same or similar components; in the description of the present disclosure, it should be understood that if there is an orientation or positional relationship indicated by the terms "upper" and "lower" and "left" and "right" etc., it is only for convenience of description and simplification of the description based on the orientation or positional relationship shown in the drawings, but it is not indicated or implied that the device or assembly referred to must have a specific orientation.

Embodiment 1

A monitoring management and control system based on panoramic big data comprises an imaging device, a credential of the imaging device, a memory, a networking device, and a processing unit. The imaging device is configured to detect a first object and determine an approximate location of the first object and a reliability value of the approximate location of the first object based on the credential of the imaging device, the memory, the networking device, and the processing unit. The credential of the imaging device is configured to be a topology of a surface that is associated with the first object or proximity between the imaging device and the first object. The memory is configured to store a predefined location of a second object. The imaging device is configured to determine whether the predefined location of the second object matches the approximate location of the first object within a predefined margin of error. The first object and distributed image elements of the approximate location of the first object are stored when there is a mismatch greater than the predefined margin of error, and the imaging device determines an exact location of the imaging device and sets an estimated position according to image elements stored in the memory when there is a match within the predefined margin of error. The imaging device comprises an optical sensor, an approximate location module, a reliability value module, and a matching module. The optical sensor is configured to detect the first object, the approximate location module is configured to determine the approximate location of the first object, and the reliability value module is configured to determine the reliability value of the approximate location based on the credential of the imaging device and a topology structure, and the surface that is associated with the first object or the proximity between the imaging device and the first object is determined. The matching module is configured to determine whether the predefined location of the second object matches the approximate location of the first object within the predefined margin of error. When there is a mismatch greater than the predefined margin of error, the processing unit is configured to store the first object and the approximate location of the first object on the distributed image elements, and when there is a match within the predefined margin of error, the processing unit is configured to determine the exact location of the imaging device based on the predefined location stored in the memory. The networking device is configured to access a network server, and a position of the imaging device is determined based on the network server using a navigation system, a positioning system, an accelerometer, a gyroscope, a magnetometer, a compass, and a barometer. At the same time, an approximate location of a target object is collected by using the imaging device, and the approximate location of the first object is determined by estimating a distance between the first object and surrounding objects. The second object and the predefined location of the second object are searched in a known database. The second object and the predefined location of the second object are stored in the memory. The processing unit recognizes the second object in the known database by matching a feature of the first object with known objects, wherein the feature comprises a topology of an associated surface, an identifiable feature, or at least one position in the feature. The identifiable feature comprises text, mark, or edge information. The imaging device recognizes the first object as a stationary object based on when the first object has a rigid structure property and a geographic location that can be referenced to a specific position within a specific duration can be identified. The first object is collected according to the reliability value of the approximate location or the specific duration, and the first object is ranked based on the identifiable feature. When the first object is ranked above a predefined rank, the first object and the approximate location of the first object are stored on the distributed image elements.

Embodiment 2

This embodiment should be understood to include at least all the features of any one of the foregoing embodiments and to be further improved on the basis of it. Specifically, a monitoring management and control system based on panoramic big data is provided and comprises an imaging device, a credential of the imaging device, a memory, a networking device, and a processing unit. The imaging device is configured to detect a first object and determine an approximate location of the first object and a reliability value of the approximate location based on the credential of the imaging device, the memory, the networking device, and the processing unit. Specifically, the first object is detected, and the approximate location of the first object is determined based on an approximate location of the imaging device. The reliability value of the approximate location is determined based on at least one of the credential of the imaging device, a topology of a surface that is associated with the first object, or proximity between the imaging device and the first object. A predefined location of a second object is received from the memory. The imaging device is configured to determine whether the predefined location of the second object matches the approximate location of the first object within a predefined margin of error. When there is a mismatch greater than the predefined margin of error, the approximate location of the first object is stored. When there is a match within the predefined margin of error, an exact location of the imaging device is determined based on the predefined location stored in the memory. The monitoring management and control system further comprises an environment generator for generating a three-dimensional environment, and the environment generator constructs a scene based on image elements collected by the imaging device. Specifically, the environment generator is connected to the processing unit, and the environment generator constructs the scene in real time under control of the processing unit. In this embodiment, the environment generator also performs verification based on the credential of the imaging device to ensure security of data transmission. In addition, a generation method of the credential of the imaging device comprises: dividing the image elements collected by the imaging device, generating a unique identifier of a corresponding collection device (i.e., the imaging device) by labeling characteristic data according to the image elements which have been divided, and generating the credential of the imaging device using a credential generator under control of a controller according the unique identifier. The credential of the imaging device is used as a secret key to enable the environment generator to establish the three-dimensional environment within a reasonable range. In this embodiment, for the convenience of description, the first object has been used as an example. Therefore, in this embodiment, not only the first object, but also the second object, a third object, etc., all use a construction method of the first object, so in this embodiment, it will not be repeated one by one.

The credential of the imaging device is configured to be the topology of the surface that is associated with the first object or the proximity between the imaging device and the first object. The memory is configured to store the predefined location of the second object. The imaging device is configured to determine whether the predefined location of the second object matches the approximate location of the first object within the predefined margin of error. The first object and distributed image elements of the approximate location of the first object are stored when there is a mismatch greater than the predefined margin of error, and the imaging device determines an exact location of the imaging device and sets an estimated position according to the image elements stored in the memory when there is a match within the predefined margin of error. The credential of the imaging device can perform data collection based on the first object and the topology of the surface that is associated with the first object or based on the proximity between the imaging device and the first object and can generate data based on failure data, which effectively guarantees that the credential of the imaging device can be used in the entire system. In addition, in this embodiment, after the imaging device collects the first object, the imaging device will perform data collection with respect to a next object. A collecting process of the imaging device is to sequentially perform data collection within a visual range related to the first object, which effectively ensures that the imaging device, during the collecting process, will completely perform data collection. After data is collected by the imaging device, the processing unit is configured to reconstruct an environment based on the data collected by the imaging device, gradually construct a panoramic view of the environment, make a judgment about an estimated position of a surrounding environment, and make a final determination of the estimated position combined with a collection of big data of the networking device. In this embodiment, the data collected by the imaging device is stored in a database, and a type of each object is classified by the database. In this embodiment, in a process of constructing the surrounding environment, a panoramic environment can be monitored according to a tracking of markers, for example, "street signs" may be an appropriate classification. The street signs are stored in the database after the networking device performs the collection of big data, and in a process of building a panoramic model, each data stored in the database can be called in real time.

The imaging device comprises an optical sensor, an approximate location module, a reliability value module, and a matching module. The optical sensor is configured to detect the first object, the approximate location module is configured to determine the approximate location of the first object, and the reliability value module is configured to determine the reliability value of the approximate location based on the credential of the imaging device and a topology structure and the surface that is associated with the first object or the proximity between the imaging device and the first object is determined. The matching module is configured to determine whether the predefined location of the second object matches the approximate location of the first object within the predefined margin of error. When there is a mismatch greater than the predefined margin of error, the processing unit is configured to store the first object and the approximate location of the first object on the distributed image elements, and when there is a match within the predefined margin of error, the processing unit is configured to determine the exact location of the imaging device based on the predefined location stored in the memory. Specifically, in this embodiment, the entire system also comprises various data of a network server and location information or panoramic images collected by surveillance cameras.

The imaging device can comprise the optical sensor configured to detect the first object, and the optical sensor may convert light into an electronic signal to detect the first object. The optical sensor may measure a physical quantity of light and then convert the physical quantity of light into a form that can be read by the imaging device. In this embodiment, the imaging device comprises a microprocessor, and the microprocessor comprises the approximate location module, the reliability value module, and the matching module. The approximate location module is configured to determine the approximate location of the first object. The reliability value module is configured to determine the reliability value of the approximate location based on at least one of the credential of the imaging device, the topology of the surface that is associated with the first object, or the proximity between the imaging device and the first object to ensure that the collected images conform to the construction of the entire panorama.

In this embodiment, the imaging device may comprise the memory configured to store the predefined position of the second object. The first object comprises a first thing, a second thing . . . , an Nth thing. In this embodiment, the second thing may be different or the same as the first thing. The matching module is configured to determine whether a predefined location of a second thing matches an approximate location of the first thing within a predefined margin of error. When there is a mismatch greater than the predefined margin of error, the processing unit is configured to store the first thing and the approximate location of the first object on distributed image elements, and when there is a match within the predefined margin of error, the processing unit is configured to determine an exact location of the imaging device based on the predefined location of the second thing stored in the memory. Through a switch of position information, the real-time monitoring of panoramic environment is ensured and real-time switching is performed, so that the whole system has an advantage of high response.

A capability and accuracy of the imaging device may depend on but is not limited to many factors, such as aperture size, number of pixels, lens, pixel size, and image stabilization technology in the camera. In addition, the imaging device can also perform a search by evaluating an instant field of view and a total distance considered from an origin of the imaging device or by determining a specific field of view by knowing a horizontal and vertical ratio of an image surface area and a representative image defined by a lens angle. Then, based on a determined camera viewing distance, a field of view (i.e., the specific field of view) can be stretched three-dimensionally through a camera axis. Then, a recognized three-dimensional geometric figure can be regarded as a search boundary of a recognized object. A starting point of the search boundary of the recognized object can be a center point of a camera lens, and an end point of the search boundary of the recognized object can be any distance determined by software.

The networking device is configured to access the network server, and a position of the imaging device is determined based on the network server using a navigation system, a positioning system, an accelerometer, a gyroscope, a magnetometer, a compass, and a barometer. At the same time, an approximate location of a target object is collected by using the imaging device, and the approximate location of the first object is determined by estimating a distance between the first object and surrounding objects. The second object and the predefined location of the second object are searched in a known database. The second object and the predefined location of the second object are stored in the memory. Specifically, the networking device is used to perform data collection from the network server, so that the monitoring of the panoramic environment, which has been constructed, is more reasonable and reliable; in addition, the data collection based on big data is more efficient to construct the panoramic environment. According to the navigation system, the positioning system, the accelerometer, the gyroscope, the magnetometer, the compass, and the barometer, information about each data in the position of the imaging device are determined, which provides a reference for a process of constructing the panoramic environment. In a follow-up monitoring process, the information about each data in the position of the imaging device plays a real-time output role for a quality of the entire system monitoring.

In this embodiment, a method for collecting data by the imaging device comprises: generating encoded data by the processing unit processing image data; generating, by the processing unit, a plurality of encoded retinal images from the encoded data; generating, by the processing unit, dimension reduced data from the plurality of encoded retinal images, wherein generating the dimension reduced data comprises generating feature data for a plurality of retinal image regions from the plurality of encoded retinal images, and wherein the feature data comprises components, the components are divided according to values associated with respective regions of the plurality of retinal image regions from the plurality of encoded retinal images, and the components are divided therein. Generating the dimension reduced data comprises applying a dimension reduction algorithm to the plurality of retinal encoded images, wherein the dimension reduction algorithm selects a subset of features of the encoded retinal images for a specific camera or monitor and ignores other functions of the encoded retinal images of a task of the specific camera or monitor. Generating encoded data by the processing unit processing the image data comprises dimensionally reducing the image data, wherein generating the dimension reduced data from the plurality of encoded retinal images comprises an additional dimension reduction operation. The processing unit receives the image data from a camera or a monitor. The feature data comprises motion data corresponding to each of the plurality of retinal image regions. The motion data comprises speed data corresponding to each of the plurality of retinal image regions. The feature data comprises optical flow data corresponding to each of the plurality of retinal image regions. Generating the plurality of encoded retinal images comprises applying a trained algorithm to the encoded data. The trained algorithm comprises a convolutional neural network. The additional dimension reduction operation comprises additionally compressing the encoded data that is already dimensionally reduced relative to the image data.

In this embodiment, a method for collecting components of feature data is provided. The method comprises collecting K sets of data from the feature data, combining the K sets of data to form an X*Y matrix, and putting the X*Y matrix into a formula (1) to adjust an angle of the imaging device.

$$Sit(Xi,Yj)=E[(Xi)-E(Xi)*(Yj-E(Yj))] \quad (1)$$

Sit represents a coordinate value, E represents an expected value, Xi is i components of the feature data extracted from the X column, Yj is j components of the feature data extracted from the Y row, and a matrix is obtained. The purpose is to remove redundant interference values which have been collected.

The matrix is put into a formula (2) for calculating a rotation vector to obtain an adjusted parameter value, the rotation vector (i.e., a size of the rotation vector is set to be a 1×3 vector or a 3×3 rotation matrix), and a translation vector (tx, ty, tz). The rotation vector is a compact realization form of the rotation matrix, and the rotation vector is a 1×3 row vector.

$$\theta \leftarrow norm(r) \quad (2)$$
$$r \leftarrow r/\theta$$
$$R = \cos\theta I + (1-\cos\theta)rr^T + \sin\theta \begin{bmatrix} 0 & -r_z & r_y \\ r_z & 0 & -r_x \\ -r_y & r_x & 0 \end{bmatrix}$$

In the formula (2), r is the rotation vector, a direction of the rotation vector is the rotation axis, and a module of the rotation vector is an angle of rotation around the rotation axis. Through the formula (2), a rotation matrix R can be obtained. When the rotation matrix has been known before obtaining the rotation vector, the rotation matrix, which has been known, can be put into a formula (3) to obtain a rotation vector T.

$$\sin(\theta)\begin{bmatrix} 0 & -r_z & r_y \\ r_z & 0 & -r_x \\ -r_y & r_x & 0 \end{bmatrix} = \frac{R-R^T}{2} \quad (3)$$

The rotation vector T is the parameter for adjusting the entire monitoring system. Those skilled in the art can also adjust monitoring devices (e.g., the imaging device) by using technical means commonly used in the art to ensure that the monitoring angle of the monitoring devices reaches the optimal position. Therefore, in this embodiment, it will not be repeated one by one.

The processing unit recognizes the second object in the known database by matching a feature of the first object with known objects, wherein the feature comprises a topology of an associated surface, an identifiable feature, or at least one position in the feature. The identifiable feature comprises text, mark, or edge information. These identifiable features can provide unique position information in three-dimensional (3D) space, which can allow a native augmented reality to calculate the imaging device's exact real-time, absolute, spatial position and altitude. The database of known objects can be organized by many techniques. Meanwhile, the database of known objects can categorize all objects by absolute coordinates and altitude. In different sensing capabilities and levels of precision, an adaptive level of precision for each object can be in place so that devices may report new objects at low polygon resolution without having to meet a specific requirement. In that sense, objects entered in the database may be initially defined within a three-dimensional box, where the object is calculated to exist within those parameters and a center point of that box volume is the defined center point. From that basic measure, objects may hold more accuracy in the form of detected boundaries, faces, edges, and vertices which ultimately form a 3D object. In an actual process of ensuring panoramic monitoring, the monitoring scene is constructed to effectively ensure the real-time and effective monitoring of the imaging device.

The imaging device recognizes the first object as a stationary object when the first object has a rigid structure property and a geographic location that can be referenced to a specific position within a specific duration can be identified. The first object is collected according to the reliability value of the approximate location or the specific duration, and the first object is ranked based on the identifiable feature. When the first object is ranked above a predefined rank, the first object and the approximate location of the first object are stored on the distributed image elements. Specifically, in this embodiment, when the first object is ranked above a predefined rank, when the first object has a prequalified status, and when the first object and the location of the first object can be obtained, the first object and approximate location of the first object are stored on the distributed image elements. In above several situations, the images collected by the imaging device are divided for the entire device (i.e., the imaging device), and the images collected by the imaging device are ranked to ensure that the imaging device has a best effect of the imaging or monitoring and also meet the actual needs. In this embodiment, for instance, a building foundation may be stationary for decades where an exterior décor of the building (e.g., a storefront sign) may only be static for a few months. Objects with a higher longevity ranking may be used to adjudicate a device's true position during granular position calculations. A monitoring ability of the entire system can be effectively improved through ranking the identifiable features. In this embodiment, rigid structures comprises permanent buildings, road signs, parks, or rivers set in the scene model, that is, facilities or buildings that will not disappear in a short time. The first object can be ranked according to duration between disappearance and establishment of the rigid structure and can also be ranked according to other methods known to those skilled in the art; this embodiment will not be repeated one by one.

In the foregoing embodiments, the description of each embodiment has its own focus. For parts that are not detailed or recorded in an embodiment, reference may be made to related descriptions of other embodiments.

In summary, the monitoring management and control system based on panoramic big data ensures classification is simpler and more reliable by generating the credential of the imaging device, including dividing the image elements collected by the imaging device and generating a unique identifier of a corresponding collection device (i.e., the imaging device), by labeling feature data according to the image elements which have been divided. The monitoring management and control system based on panoramic big data ensures security of data transmission by the environment generator performing verification based on the credential of the imaging device. After data is collected by the imaging device, the processing unit is configured to reconstruct an environment based on the data collected by the imaging device, gradually construct a panoramic view of the environment, make a judgment about an estimated position of a surrounding environment, and make a final determination of the estimated position combined with a collection of big data of the networking device. The reliability value module is configured to determine the reliability value of the approximate location based on at least one of the credential of the imaging device, the topology of the surface that is associated with the first object, or the proximity between the imaging device and the first object to ensure that the collected images conform to the construction of the entire panorama. By using the matching module to switch the same location and switch between different locations, the whole system has an advantage of high response. By using the network server and the network server to collect big data, the construction of a panoramic environment monitoring is made more reasonable and reliable.

While the disclosure has been described above by reference to various embodiments, it should be understood that many changes and modifications can be made without departing from the scope of the disclosure. That is, the methods, systems, and devices discussed above are examples. Various configurations may omit, substitute, or add various procedures or components as appropriate. For example, in alternative configurations, the methods may be performed in an order different than that described, and/or various components may be added, omitted, and/or combined. Moreover, features described with respect to certain configurations may be combined in various other configurations, as different aspects and elements of the configurations may be combined in a similar manner. Further, elements therein may be updated as technology evolves, i.e., many elements are examples and do not limit the scope of the disclosure or claims.

Specific details are given in the description to provide a thorough understanding of the exemplary configurations including implementations. However, configurations may be practiced without these specific details, for example, well-known circuits, processes, algorithms, structures, and techniques have been shown without unnecessary detail in order to avoid obscuring the configurations. This description provides example configurations only, and does not limit the scope, applicability, or configuration of the claims. Rather, the foregoing description of the configurations will provide those skilled in the art with an enabling description for implementing the described techniques. Various changes may be made in the function and arrangement of elements without departing from the spirit or scope of the disclosure.

In conclusion, it is intended that the foregoing detailed description be regarded as illustrative rather than limiting, and that it be understood that these examples are illustrative only and are not intended to limit the scope of the disclosure. After reading the description of the disclosure, the skilled person can make various changes or modifications to the disclosure, and these equivalent changes and modifications also fall into the scope of the disclosure defined by the claims.

What is claimed is:

1. A monitoring management and control system based on panoramic big data, comprising:
    an imaging device,
    a credential of the imaging device,
    a memory,
    a networking device, and
    a processing unit, wherein:
        the imaging device is configured to detect a first object and determine an approximate location of the first object and a reliability value of the approximate location of the first object based on the credential of the imaging device, the memory, the networking device,
        and the processing unit,
        the credential of the imaging device is configured to be a topology of a surface that is associated with the first object or proximity between the imaging device and the first object,
        the memory is configured to store a predefined location of a second object,
        the imaging device is configured to determine whether the predefined location of the second object matches the approximate location of the first object within a predefined margin of error,
        when there is a mismatch greater than the predefined margin of error, the first object and distributed image elements of the approximate location of the first object are stored,
        when there is a match within the predefined margin of error, the imaging device determines an exact location of the imaging device and sets an estimated position according to image elements stored in the memory,
        the processing unit is configured to execute instructions stored in the memory to perform a method for collecting data by the imaging device, comprising:
        generating encoded data from image data;
        generating a plurality of encoded retinal images from the encoded data; and
        generating dimension reduced data from the plurality of encoded retinal images,
        generating the dimension reduced data comprises generating feature data for a plurality of retinal image regions from the plurality of encoded retinal images,
        the feature data comprises components,
        the components are divided based on values associated with different regions of the plurality of retinal image regions from the plurality of encoded retinal images,
        the generating the dimension reduced data comprises applying a dimension reduction algorithm to the plurality of encoded retinal images,
        the dimension reduction algorithm selects a subset of features of the encoded retinal images for a specific camera or monitor and ignores other functions of the encoded retinal images of a task of the specific camera or monitor,
        the generating encoded data from the image data comprises dimensionally reducing the image data,
        generating the dimension reduced data from the plurality of encoded retinal images comprises an additional dimension reduction operation,
        the processing unit receives the image data from a camera or a monitor,
        the feature data comprises motion data corresponding to each of the plurality of retinal image regions, the motion data comprises speed data corresponding to each of the plurality of retinal image regions, the feature data comprises optical flow data corresponding to each of the plurality of retinal image regions, the generating the plurality of encoded retinal images comprises applying a trained algorithm to the encoded data, the trained algorithm comprises a convolutional neural network, the additional dimension reduction operation comprises additionally compressing the encoded data that is already dimensionally reduced relative to the image data, and the processing unit is configured to execute instructions stored in the memory to perform a method for collecting K sets of data from the feature data, comprising:

combining the K sets of data to form an X*Y matrix, and putting the X*Y matrix into a formula (1) to adjust an angle of the imaging device, $$Sit(Xi, Yj) = E[(Xi - E(Xi)*(Yj - E(Yj))] \quad (1),$$

wherein Sit represents a coordinate value, E represents an expected value, Xi is i components of the feature data extracted from the X column, Yj is j components of the feature data extracted from the Y row, and a matrix is obtained, putting the matrix into a formula (2) for calculating a rotation vector to obtain an adjusted parameter value, the rotation vector, and a translation vector, wherein the rotation vector is a compact realization form of a rotation matrix, and the rotation vector is a 1×3 row vector, and $$\theta \leftarrow \text{norm}(r) \quad (2)$$

$$r \leftarrow r/\theta$$

$$R = \cos\theta I + (1 - \cos\theta)rr^T + \sin\theta \begin{bmatrix} 0 & -r_z & r_y \\ r_z & 0 & -r_x \\ -r_y & r_x & 0 \end{bmatrix}$$

obtaining the rotation matrix R through the formula (2), wherein in the formula (2), r is the rotation vector, a direction of the rotation vector is a rotation axis, and a module of the rotation vector is an angle of rotation around the rotation axis, or obtaining a rotation vector T through a formula (3) when the rotation matrix has been known before obtaining the rotation vector, $$\sin(\theta) \begin{bmatrix} 0 & -r_z & r_y \\ r_z & 0 & -r_x \\ -r_y & r_x & 0 \end{bmatrix} = \frac{R - R^T}{2}, \quad (3)$$

wherein the rotation vector T is a parameter for adjusting the monitoring management and control system.

2. The monitoring management and control system based on panoramic big data according to claim 1, wherein:

the imaging device comprises an optical sensor, an approximate location module, a reliability value module, and a matching module, the optical sensor is configured to detect the first object, the approximate location module is configured to determine the approximate location of the first object, the reliability value module is configured to determine the reliability value of the approximate location based on the credential of the imaging device or a topology structure, the surface that is associated with the first object or the proximity between the imaging device and the first object is determined, the matching module is configured to determine whether the predefined location of the second object matches the approximate location of the first object within the predefined margin of error, when there is the mismatch greater than the predefined margin of error, the processing unit is configured to store the first object and the approximate location of the first object on the distributed image elements, and when there is the match within the predefined margin of error, the processing unit is configured to determine the exact location of the imaging device based on the predefined location stored in the memory.

3. The monitoring management and control system based on panoramic big data according to claim 2, wherein:

the networking device is configured to access a network server to determine a position of the imaging device based on the network server using a navigation system, a positioning system, an accelerometer, a gyroscope, a magnetometer, a compass, and a barometer, the approximate location of the first object and an approximate location of the second object are collected by using the imaging device, the approximate location of the first object is determined by estimating a distance between the first object and surrounding objects, the second object and the predefined location of the second object are searched in a known database, and the second object and the predefined location of the second object are stored in the memory.

4. The monitoring management and control system based on panoramic big data according to claim 1, wherein:

the processing unit is configured to recognize the second object in a known database by matching a feature of the first object with known objects, the feature comprises a topology of an associated surface, an identifiable feature, or at least one position in the feature, and the identifiable feature comprises text, mark, or edge information.

5. The monitoring management and control system based on panoramic big data according to claim 1, wherein:

the imaging device is configured to recognize the first object as a stationary object based on when the first object has a rigid structure property and a geographic location that can be referenced to a specific position within a specific duration, the first object is collected according to the reliability value of the approximate location or the specific duration, the first object is ranked based on an identifiable feature, and when the first object is ranked above a predefined rank, the first object and the approximate location of the first object are stored on the distributed image elements.

* * * * *